(12) United States Patent
Koch et al.

(10) Patent No.: US 8,586,220 B2
(45) Date of Patent: Nov. 19, 2013

(54) ACCUMULATOR

(75) Inventors: Ingo Koch, Hameln (DE); Amo Koerber, Berlin (DE); Dirk Bremer, Neustadt (DE)

(73) Assignee: Johnson Controls Autobatterie GmbH & Co. KGaA, Hannover (DE)

( * ) Notice: Subject to any disclaimer, the term of this patent is extended or adjusted under 35 U.S.C. 154(b) by 562 days.

(21) Appl. No.: 12/808,440

(22) PCT Filed: Oct. 2, 2008

(86) PCT No.: PCT/EP2008/008367
§ 371 (c)(1),
(2), (4) Date: Jul. 14, 2010

(87) PCT Pub. No.: WO2009/077022
PCT Pub. Date: Jun. 25, 2009

(65) Prior Publication Data
US 2010/0279157 A1     Nov. 4, 2010

(30) Foreign Application Priority Data
Dec. 18, 2007 (DE) .......................... 10 2007 061 662

(51) Int. Cl.
*H01M 2/00* (2006.01)
(52) U.S. Cl.
USPC .................. 429/67; 429/51; 429/70; 429/103
(58) Field of Classification Search
USPC ................................ 429/51, 70, 67, 101–103
See application file for complete search history.

(56) References Cited

U.S. PATENT DOCUMENTS

| 529,199 | A | | 11/1894 | Schoop |
| 3,166,447 | A | * | 1/1965 | Bronstert et al. ............... 429/70 |
| 3,716,413 | A | * | 2/1973 | Eisner ........................... 429/406 |

(Continued)

FOREIGN PATENT DOCUMENTS

| DE | 78 061 C | 11/1884 |
| DE | 197 22 361 A1 | 12/1998 |
| DE | 10 2006 021 584 A1 | 11/2007 |

OTHER PUBLICATIONS

International Preliminary Report on Patentability dated Jul. 2010 for International Application No. PCT/EP08/008367.

*Primary Examiner* — Joseph S Del Sole
*Assistant Examiner* — Nahida Sultana
(74) *Attorney, Agent, or Firm* — Boardman & Clark LLP

(57) ABSTRACT

An accumulator with an accumulator housing, having at least one cell changer, with several electrodes and liquid electrolyte in each cell chamber with at least one wall element in the cell chambers to divide the cell chambers into at least two intercommunicating volume chambers. In the lower region of the volume chambers is a communicating connection for the liquid electrolyte between the volume chambers and a pressure equalization connection between the volume chambers is arranged in the upper region of the volume chambers to assure an equivalent air pressure in the intercommunicating volume chambers. The wall elements extend at least far upwards such that on movement of the accumulator firstly electrolyte in at least one volume chamber flows through the intercommunicating connection in the lower region and secondly electrolyte again flows through the intercommunicating connection in the lower region out of said at least one volume region without an overflow of liquid electrolyte from one volume chamber to the adjacent volume chamber over the upper edge of the wall elements.

10 Claims, 2 Drawing Sheets

(56) References Cited

U.S. PATENT DOCUMENTS

| | | | |
|---|---|---|---|
| 3,740,272 A * | 6/1973 | Blaich et al. | 429/63 |
| 4,306,001 A * | 12/1981 | Brown | 429/61 |
| 4,439,501 A * | 3/1984 | Flanagan | 429/70 |
| 4,963,444 A * | 10/1990 | Delaney | 429/67 |
| 5,096,787 A | 3/1992 | Delaney et al. | |
| 2004/0048144 A1* | 3/2004 | Fitter et al. | 429/61 |
| 2012/0202095 A1* | 8/2012 | Winter | 429/51 |

* cited by examiner

ACCUMULATOR

CROSS REFERENCE TO RELATED PATENT APPLICATIONS

This application is a national application of PCT/EP2008/008367 which claims priority to and the benefit of German Patent Application DE 10 2007 061 662.9, the entireties of both of which are incorporated herein by reference.

BACKGROUND

U.S. Pat. No. 4,963,444 A and U.S. Pat. No. 5,096,787 A disclose a lead-acid battery having a housing which is subdivided into a plurality of cell areas. Electrolyte plate stacks containing lead are held in the cell areas and are separated from one another by separators. Furthermore, the cell areas are filled with liquid electrolyte which, in particular, contains sulfuric acid.

During operation, the acid concentration may be distributed non-uniformly over the height of the rechargeable battery, thus leading to a reduction in the storage capacity of the rechargeable battery. It is therefore desirable to mix the liquid electrolyte during operation. For this purpose, a hydrostatic pump is created by wall elements adjacent to side walls of the rechargeable battery housing. When the rechargeable battery moves, electrolyte sloshes over the upper edge of the walls into the volume area bounded by a wall, as a result of which the electrolyte level in this volume area is higher than in the adjacent volume area. During movement, electrolyte additionally flows through an opening in the lower area into the volume area bounded by the wall elements. The electrolyte level, which is now higher in this volume area, leads to a hydrostatic overpressure in the volume area, as a result of which electrolyte flows away again out of the overfilled volume area into the adjacent volume area. The hydrostatic pump therefore ensures that a circulating electrolyte movement occurs.

The circulating electrolyte movement has the disadvantage, however, that sludge and particles deposited in the lower area are picked up and are moved into the area above the separators. This increases the risk of short-circuiting.

U.S. Pat. No. 529,199 discloses a rechargeable battery system in which fluid is caused to circulate by means of a pump device. In one embodiment, rechargeable batteries are mounted on a rocker in order to use outlet elements and grooves to ensure that the electrolyte circulates.

SUMMARY

The invention relates to a rechargeable battery having a rechargeable battery housing which has at least one cell area, having a plurality of electrodes and having liquid, electrolytes in each cell area and having in each case at least one wall element in the cell areas in order to subdivide the cell areas into in each case at least two volume areas which communicate with one another, wherein there is a communicating connection in the lower area of the volume areas, between the volume areas for the liquid electrolyte, and there is a pressure equalizing connection in the upper area of the volume areas between the volume areas in order to ensure that the air pressure is the same in the volume areas which communicate with one another.

Against the background, the object of the present invention is to provide an improved rechargeable battery having a rechargeable battery housing of the type mentioned initially, in which the formation of acid stratification during operation is effectively counteracted, while sludge which has already been deposited is not moved to the upper cell area.

The object is achieved by the rechargeable battery of the type mentioned initially in that the wall elements extend at least so far upward that, in a first step, when a movement load is applied to the rechargeable battery, electrolyte flows into at least one volume area via the communicating connection in the lower area and, in the second step, electrolyte flows away out of this at least one volume are again via the communicating connection in the lower area, without liquid electrolyte overflowing from one volume area to the adjacent volume area over the upper edge of the wall elements.

In contrast to the known embodiment, the principle of a communicating tube is used to ensure that the electrolyte moves backward and forward via the communicating connection in the lower area of the volume areas, and that the electrolyte cannot circulate. This has the advantage that sludge which gathers at the bottom remains there, since the electrolyte does not circulate. The electrolyte movement which necessarily occurs with a communicating tube such as this is sufficient to overcome acid stratification.

The critical factor for this is that the wall elements extend upward so far in the direction of the cover which closes the cell areas that no significant amounts of electrolyte overflow over the wall elements into the adjacent volume area during movement of the rechargeable battery during normal operation, that is to say in the event of the rechargeable battery being tilted, accelerated or decelerated.

Furthermore, the functionality, of the communicating tubes can be ensured only if the pressure is equalized in the upper area between the volume areas, such that the air pressure on the electrolyte located in the volume areas is approximately the same. A pressure equalizing connection is provided between the volume areas for this purpose.

During normal operation, the angle between a plane defined by each of the wall elements and the electrolyte level in the rest position is approximately 90°. Normal operation still occurs when the angle between the electrolyte level and the plane defined by a wall element is reduced to 83°, preferably to 80°, and particularly preferably to 70°. The aim is that electrolyte should be prevented from overflowing over the upper edge of the wall elements up to an inclined position of the electrolyte level such as this, in order to achieve the effect of the communicating tubes during such normal loading.

Correspondingly, the wall elements should therefore extend so far upward that, when filled with electrolyte to the nominal filling height specified by the manufacturer, electrolyte cannot overflow between the current electrolyte level and a normal electrolyte level defined in the rechargeable battery housing, up to an angle of at least 7°. In one preferred embodiment, this angle is at least 10°, and in a particularly preferred embodiment, it is at least 20°.

It is advantageous for a wall element to be arranged immediately adjacent to a vertical cell area wall, such that a vertical wall section extends over the height of the electrodes, which are in the form of plates and are held in the cell area, and a horizontal wall section originates from the vertical wall section above the electrode plates. In an embodiment such as this, a further vertical wall section can extend from the horizontal wall section, opposite the electrodes, in the direction of the cover section of the cell area. This results in a storage area above the electrode plates in which electrolyte can gather which flows from the lower area into the volume area during forward movement of the rechargeable battery. During backward movement of the rechargeable battery, or when it is subsequently stationary, the electrolyte which has gathered in the collection area then once again flows downward via the lower area of the volume areas which communicate with one another into the adjacent volume areas. This results in a forward and backward flow of the electrolyte, which leads to mixing by turbulence.

In one advantageous embodiment, particularly when the electrode plates are close to one another and allow only a negligible amount of acid to pass through, the volume areas are partially compartmentalized by side edges, which are adjacent to one another, of the stacked electrode plates. The side edges of the electrode plates which are separated from one another by separators, together with these separators, therefore form a part of the wall elements.

The wall elements may extend between two mutually opposite side walls of the cell areas and may be connected in a sealed manner to these side walls. This results in a volume area being bounded in a defined tilting direction. The wall elements preferably extend between the closely adjacent side walls of a rectangular cell area.

The cell areas may each have two mutually opposite wall elements in order to create volume areas in the cell area sections which are adjacent to opposite side walls. The communicating tubes therefore become active during forward and backward movement on both opposite cell area sections, with the storage area in one cell area section being filled during forward movement, and the storage area in the opposite volume area being emptied at the same time. The process is correspondingly reversed during backward movement.

The wall elements may be connected in a sealed manner to an adjacent cover part of the rechargeable battery housing, which in each case closes the cell areas at the top. This completely prevents electrolyte from overflowing over the upper edges of the wall elements. However, in an embodiment such as this, a pressure equalizing connection must be provided, for example made via holes which pass through the cover part from the volume area.

BRIEF DESCRIPTION OF THE DRAWINGS

The invention will be explained in more detail in the following text with reference to one exemplary embodiment and the attached drawings, in which.

DETAILED DESCRIPTION

Figure 1:
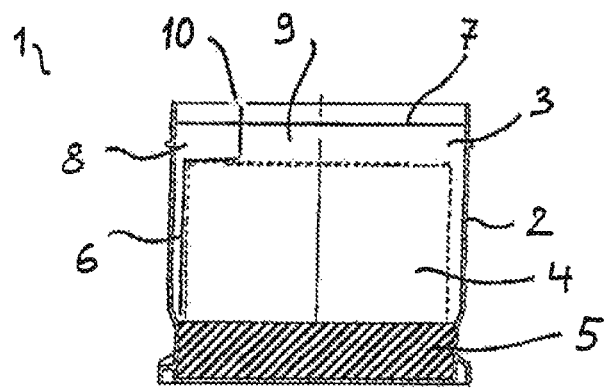
FIG. 1 shows a section view through a rechargeable battery having two volume areas which are separated by a wall element.

FIG. 1 shows a section view of a rechargeable battery 1 which has a rechargeable battery housing 2 in a manner known per se, which is closed in a manner known per se by a cover (not shown). Degassing channels can be formed in a manner known per se in the cover which, for example, is in the form of a double cover with an upper and a lower cover part with webs between them.

The rechargeable battery housing 2 is subdivided into cell areas, with the section in FIG. 1 showing one such cell area 3. Electrodes 4 in the form of plates are stacked in the cell areas 3, adjacent to one another, but separated from one another by separators.

In this case, the electrode plates 4 may be inserted into separator pockets. An electrode plate stack such as this has alternately positive and negative electrode plates. The cell areas 3 are filled with liquid electrolytes, in particular with sulfuric acid, in order, together with the electrodes 4, to form an electrochemical element. The area 5 represents electrolyte with a higher concentration.

At least one wall element 6 is fitted in the cell areas 3 and extends upward above the electrolyte level 7 when this level is at the nominal filling height specified by the manufacturer. By way of example, the wall element 6 has a first section, which extends parallel to one side edge of the electrode plates 4, a horizontal section which originates, for example transversely, at an angle above the electrode plates 4, and a vertical end section, which is adjacent thereto and passes through the electrolyte level 7 when it is at the nominal filling height. This results in a first volume area 8 on the left-hand side of the cell area 3 being bounded, said volume area having a storage area in the upper area. A second volume area 9 is bounded from the first volume area 8 by the wall element on the right-hand side of the cell area 3.

The first volume area 8 and the second volume area 9 are connected to one another, to provide communication, in the lower area. To this end, in one preferred exemplary embodiment, it is possible for the wall element 6 not to extend completely in the lower area as far as that edge of the rechargeable battery housing 2 which runs inclined inward. It is, however, also feasible for the wall element 6 to be shaped to be integral with the rechargeable battery housing 2 in the lower area and for openings to be provided in the lower area of the wall element 6, through which electrolyte can flow from the first volume area 8 into the second volume area 9, and vice versa.

The important factor is that the wall element 6 extends at least so far upward above the electrolyte level 7 that no significant amount of electrolyte flows over the upper edge of the wall element 6 during normal operation.

Furthermore, openings 10 in the upper area of the volume areas 8, 9 ensure that there is a pressure equalizing connection between the volume areas 8, 9, as a result of which the air pressure is the same in the upper area of the volume areas 8, 9.

This results in a system of communicating tubes. Communicating tubes and communicating vessels are vessels which are open at the top, but which are connected to one another at the bottom and in which the liquid level is as high as the specific densities predetermine in the equalized state, irrespective of the volume of the vessels which communicate with one another.

Figure 2:
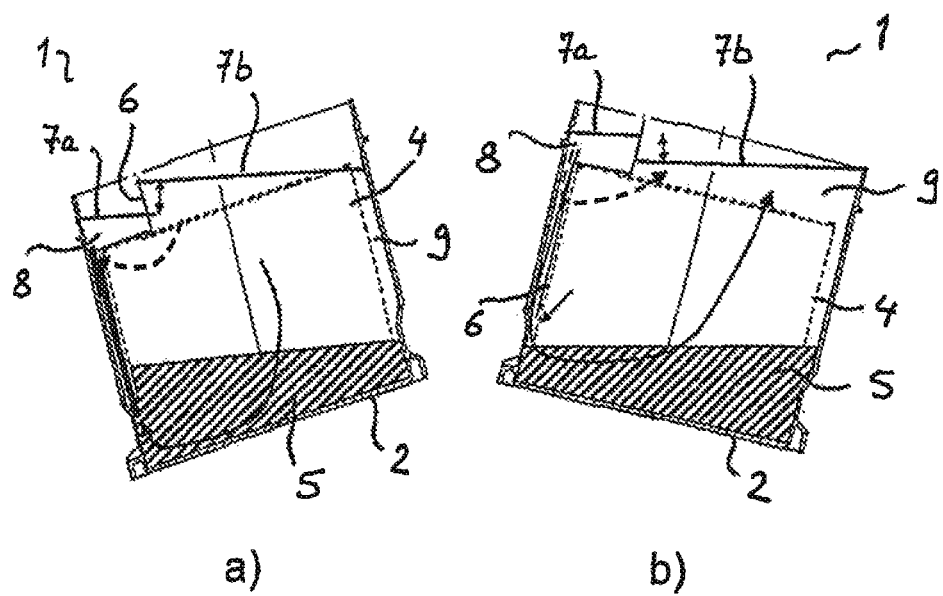
FIGS. 2a and b show the rechargeable battery shown in FIG. 1, in two opposite tilted positions.

FIG. 2 shows the rechargeable battery 1 from FIG. 1 in two opposite tilted positions. In FIG. 2a), the rechargeable battery is tilted to the left, which leads to different electrolyte levels 7a, 7b in the first volume area 8 and in the second volume area 9. The difference d between the two electrolyte levels 7a, 7b results in equalization in the volume areas, such that electrolyte flows from the bottom via the communicating connection between the first and second volume areas 8, 9 in the lower area of the second volume area 9 into the first volume area 8. More highly concentrated electrolyte (area 5) is therefore fed upward, where it is mixed with the less concentrated electrolyte.

On tilting back to the opposite tilted position shown in FIG. 2b), the electrolyte level 7a in the first volume area 8 is higher than the electrolyte level 7b in the second volume area 9. This leads to the electrolyte stored in the first volume area 8 partially flowing back again into the second volume area 9 via the communicating connection in the lower area of the volume areas 8, 9. This flow produces a vortex which leads to the highly concentrated electrolyte (area 5) and the rest of the electrolyte being mixed thoroughly.

The flow direction in the lower area of the volume areas 8, 9 is indicated by the arrows.

The important factor is that the wall elements 6 prevent electrolyte from flowing backward and forward in the upper area of the electrolyte level, as indicated by the dashed arrows.

A further critical factor for the functional principle that is used is that the wall elements 6 are drawn sufficiently high that no significant amounts of electrolyte can flow over the upper edge of the wall elements from one volume area into the adjacent volume area. This ensures that electrolyte can flow only via the communicating connection in the lower area of the volume areas 8, 9. This has the advantage that any sludge and particle residues which occur in the lower 30 area are not caused to circulate, thus increasing the risk of short-circuiting.

Figure 3:
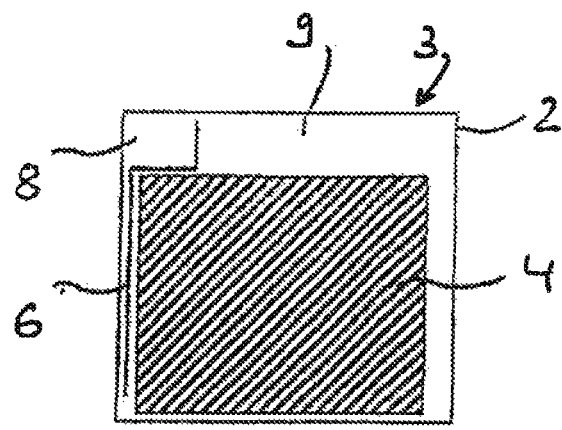
FIG. 3 shows a sketch of a wall element, which is angled upward, in a rechargeable battery housing.

FIG. 3 shows a sketch of the wall element which is angled above the electrolyte plates 4 and has a section extending vertically upward at the angled end. The wall element 6 extends along a side edge of the electrode plates over a considerable proportion of the height of the electrode plates 4. A corresponding wall element can also be arranged on the opposite side, in addition to the illustrated all element, in order to bound two side volume areas from a central volume area 9.

It is advantageous for the wall elements to extend between those side walls of a cell area 3 which are close to one another, that is to say not parallel to the electrode plates 4.

Figure 4:
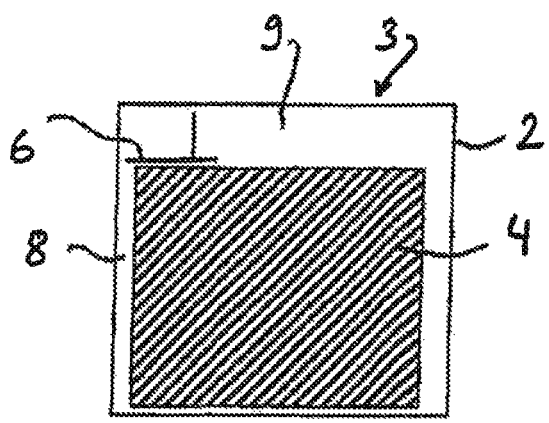
FIG. 4 shows a sketch of a wall element which is arranged above an electrode plate stack.

FIG. 4 shows another embodiment of a wall element 6, in which a part of the wall element is formed by the side edges of the electrode plates 4. The wall element therefore has only one horizontal section arranged above the electrode plates 4 and a vertical section which originates from it and extends upward in the direction of the cover (not illustrated) of the rechargeable battery housing 2.

The invention claimed is:

1. A rechargeable battery (1) comprising a rechargeable battery housing (2) which has at least one cell area, a plurality of electrodes (4) and liquid electrolytes in each cell area (3) and at least one wall element (6) in the cell areas (3) in order to subdivide the cell areas (3) into in each case at least two volume areas (8, 9) which communicate with one another, wherein there is a communicating connection in the lower area of the volume areas (8, 9), between the volume areas (8, 9) for the liquid electrolyte, and there is a pressure equalizing connection in the upper area of the volume areas (8, 9) between the volume areas (8, 9) in order to ensure that the air pressure is the same in the volume areas (8, 9) which communicate with one another, characterized in that the wall elements (6) extend at least so far upward that, in a first step, when a movement load is applied to the rechargeable battery (1), electrolyte flows into at least one volume area (8, 9) via the communicating connection in the lower area and, in the second step, electrolyte flows away out of this at least one volume area (8, 9) again via the communicating connection in the lower area, without liquid electrolyte overflowing from one volume area to the adjacent volume area (8, 9) over the upper edge of the wall elements (6).

2. The rechargeable battery (1) as claimed in claim 1, characterized in that the wall elements (6) extend so far upward that electrolyte cannot overflow between the current electrolyte level (7) and a defined normal electrolyte level in the horizontal state, up to an angle of at least 7°.

3. The rechargeable battery (1) as claimed in claim 1, characterized in that the wall elements (6) extend so far upward that electrolyte cannot overflow between the current electrolyte level (7) and a defined normal electrolyte level in the horizontal state, up to an angle of at least 10°.

4. The rechargeable battery (1) as claimed in claim 1, characterized in that the wall elements (6) extend so far upward that electrolyte cannot overflow between the current electrolyte level (7) and a defined normal electrolyte level in the horizontal state, up to an angle of at least 20°.

5. The rechargeable battery (1) as claimed in claim 1, characterized in that a wall element (6) is arranged separated by a gap from a vertical cell area wall such that a vertical wall section extends over the height of the electrodes (4), which are in the form of plates and are held in the cell area, and a horizontal wall section originates from the vertical wall section above the electrode plates (4).

6. The rechargeable battery (1) as claimed in claim 5, characterized in that a further vertical wall section extends from the horizontal wall section, opposite the electrodes (4), in the direction of the cover closure of the cell area (3).

7. The rechargeable battery (1) as claimed in claim 1, characterized in that the volume areas (8, 9) are partially compartmentalized by side edges, which are adjacent to one another, of the stacked electrode plates (4), which form part of the wall elements (6).

8. The rechargeable battery (1) as claimed in claim 1, characterized in that wall elements (6) extend between two mutually opposite side walls of the cell areas (3) and are connected in a sealed manner to these side walls.

9. The rechargeable battery (1) as claimed in claim 1, characterized in that the cell areas (3) each have two wall elements (6) in order to create volume areas (8, 9) in cell area sections which are adjacent to side walls.

10. The rechargeable battery (1) as claimed in claim 1, characterized in that the wall elements (6) are connected in a sealed manner to an adjacent cover part of the rechargeable battery housing (2), which in each case closes the cell areas (3) at the top, and the pressure equalizing connection is made via holes which pass through the cover part form the volume areas (8, 9).

* * * * *